US011633977B2

United States Patent
Choo

(10) Patent No.: US 11,633,977 B2
(45) Date of Patent: Apr. 25, 2023

(54) VIBRATION ABSORBER FOR VEHICLE WHEELS

(71) Applicants: HYUNDAI MOTOR COMPANY, Seoul (KR); KIA MOTORS CORPORATION, Seoul (KR)

(72) Inventor: Kyo Sung Choo, Gunpo-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 364 days.

(21) Appl. No.: 17/029,332

(22) Filed: Sep. 23, 2020

(65) Prior Publication Data

US 2021/0129579 A1 May 6, 2021

(30) Foreign Application Priority Data

Nov. 6, 2019 (KR) .................. 10-2019-0140575

(51) Int. Cl.
B60B 7/06 (2006.01)
B60B 7/00 (2006.01)
F16F 15/12 (2006.01)
B60B 7/08 (2006.01)

(52) U.S. Cl.
CPC ............ B60B 7/0013 (2013.01); B60B 7/066 (2013.01); B60B 7/08 (2013.01); F16F 15/1202 (2013.01); B60B 2900/131 (2013.01)

(58) Field of Classification Search
CPC ......... B60B 7/0013; B60B 7/066; B60B 7/08; B60B 2900/131; F16F 15/1202
See application file for complete search history.

(56) References Cited

U.S. PATENT DOCUMENTS

| 11,181,167 | B2* | 11/2021 | Rimai .................. F16F 15/1442 |
| 2006/0021542 | A1* | 2/2006 | Bieker ................. B60B 17/0031 |
| | | | 105/209 |
| 2017/0058993 | A1* | 3/2017 | Lim ........................ F16F 7/108 |
| 2017/0203610 | A1* | 7/2017 | Fujimoto ................ F16F 15/12 |
| 2017/0210165 | A1* | 7/2017 | Kawamura ............. F16C 35/06 |
| 2020/0386293 | A1* | 12/2020 | Rimai .................. F16F 15/1442 |
| 2022/0042574 | A1* | 2/2022 | Rimai ..................... B60B 15/28 |

* cited by examiner

Primary Examiner — Scott A Browne
(74) Attorney, Agent, or Firm — Lempia Summerfield Katz LLC

(57) ABSTRACT

A vibration absorber for vehicle wheels is capable of absorbing and attenuating vibration of a vehicle wheel and of increasing a vibration absorption capability of the wheel without changing the external appearance and design of the wheel. The vibration absorber includes a vibration absorption unit mounted on a back surface of a center cap of the vehicle wheel to absorb a first vibration in an axial direction of the wheel transmitted through the center cap.

6 Claims, 4 Drawing Sheets

VIBRATION ABSORBER FOR VEHICLE WHEELS

CROSS-REFERENCE TO RELATED APPLICATION

This application claims under 35 U.S.C. § 119(a) the benefit of priority to Korean Patent Application No. 10-2019-0140575 filed on Nov. 6, 2019, the entire contents of which are incorporated herein by reference.

BACKGROUND

(a) Technical Field

The present disclosure relates to a vibration absorber for vehicle wheels, which is capable of absorbing and attenuating vibration of a vehicle wheel.

(b) Background Art

In general, the mechanisms that cause road noise of a vehicle consist of a vibration noise source, a transmission system, and a radiation system. The wheel and tire of the vehicle are vibration noise sources that cause the road noise.

The road noise of the vehicle may vary depending on the appearance and design of the wheel. Particularly, in the frequency band of 250 to 500 Hz, called a rumble range, the magnitude of the road noise depends on the appearance and design of the wheel.

However, since the appearance and design qualities of the wheel often conflict with each other, it can be substantially impossible to optimize both the appearance and design qualities of the wheel at the same time.

Thus, in order to improve, i.e., reduce the road noise of the vehicle, the wheel has been improved in a manner that increases the stiffness of the mode associated with road noise in recent years.

Conventionally, it was intended to improve the stiffness of the wheel itself to reduce the vibration of the wheel. However, reducing the weight of the wheel is avoided since the stiffness of the wheel is deteriorated if the weight of the wheel is reduced.

Hence, it is difficult to reduce the weight of the wheel although the wheel is a component that requires a reduction in weight in terms of the fuel efficiency and ride comfort of the vehicle.

The above information disclosed in this Background section is only to enhance understanding of the background of the disclosure. Therefore, the Background section may contain information that does not form the prior art that is already known in this country to a person of ordinary skill in the art.

SUMMARY OF THE DISCLOSURE

The present disclosure has been made in an effort to solve the above-described problems associated with the prior art.

In an aspect, the present disclosure provides a vibration absorber for vehicle wheels. The vibration absorber is capable of increasing a vibration absorption capability of a wheel without changing an external appearance and design of the wheel, and the like.

In one embodiment, a vibration absorber for vehicle wheels is provided. The vibration absorber includes a center cap configured to open and close an opening provided at a center of a vehicle wheel and includes a vibration absorption unit mounted on a back surface of the center cap to absorb a vibration (first vibration) in an axial direction of the wheel transmitted through the center cap.

The vibration absorption unit may include: a housing mounted on the back surface of the center cap; a mass body disposed in an internal space of the housing to vibrate in the axial direction of the wheel by the first vibration transmitted through the center cap; and an elastic support disposed in the internal space of the housing to support the mass body such that the mass body is able to vibrate in the axial direction of the wheel.

The mass body may have a natural frequency determined according to a mass of the mass body and a stiffness of the elastic support. The natural frequency of the mass body may be determined to coincide with a natural frequency of the wheel for attenuation of the first vibration.

The internal space of the housing may be divided into a first space and a second space by the mass body. The elastic support may include an outer spring disposed in the first space and both ends thereof may be mounted to the mass body and the housing. An inner spring may be disposed in the second space and both ends thereof may be mounted to the mass body and the housing.

The center cap may include a cap part having a back surface to which the housing is attached, a flange part provided at an edge of the cap part and connected to the center of the wheel (wheel center) to receive the first vibration of the wheel, and a hooking part provided on the back surface of the cap part so that the hooking part is coupled to the wheel center when the flange part is connected to the wheel center.

The wheel center may have a stepped part connected to the flange part in a surface contact state.

The wheel may include a wheel rim on which a tire is mounted and a wheel disk coupled to a wheel hub. The housing may be mounted on the back surface of the center cap and disposed in a space between the center cap and the wheel hub.

Other aspects and embodiments of the disclosure are discussed herein.

It should be understood that the terms "vehicle" or "vehicular" or other similar terms as used herein are inclusive of motor vehicles in general such as: passenger automobiles including sports utility vehicles (SUV), buses, trucks, and various commercial vehicles; watercraft including a variety of boats and ships; aircraft and the like, and including hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, such as for example both gasoline-powered and electric-powered vehicles.

The above and other features of the disclosure are discussed herein.

BRIEF DESCRIPTION OF THE DRAWINGS

The above and other features of the present disclosure are now described in detail with reference to certain embodiments thereof illustrated in the accompanying drawings, which are given below by way of illustration only, and thus are not limitative of the present disclosure, and wherein.

Figure 1:
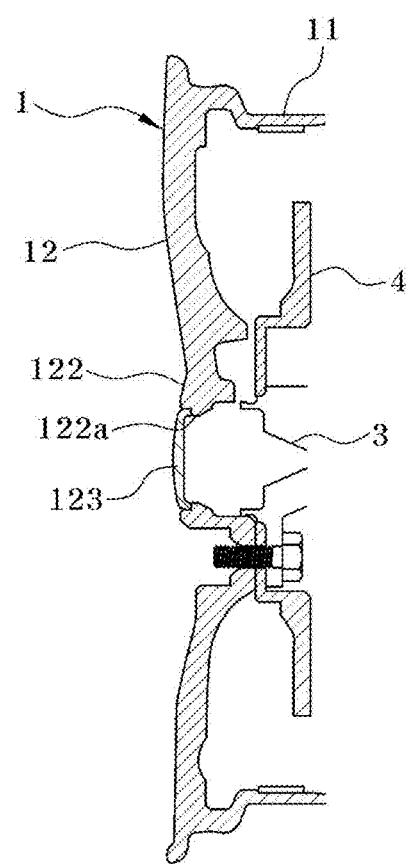
FIG. 1 is a cross-sectional view illustrating a typical vehicle wheel.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, the same reference numbers refer to the same or equivalent parts of the present disclosure throughout the several figures of the drawing.

DETAILED DESCRIPTION

Hereinafter, reference is made in detail to various embodiments of the present disclosure, examples of which are illustrated in the accompanying drawings and described below. While the disclosure is described in conjunction with specific embodiments, it should be understood that the present description is not intended to limit the disclosure to those specific embodiments. On the contrary, the disclosure is intended to cover not only the disclosed embodiments, but also various alternatives, modifications, equivalents, and other embodiments, which may be included within the spirit and scope of the disclosure as defined by the appended claims.

As illustrated in FIG. 1, a typical wheel 1 of a vehicle includes a wheel rim 11 on which a tire is mounted and includes a wheel disk 12 fastened to a wheel hub 3. The wheel hub 3 is coupled to a drive shaft to rotate integrally therewith. The wheel hub 3 is rotated by the driving force transmitted from the drive source (engine or the like) of the vehicle to the drive shaft.

The wheel 1 may cause various modes of vibration during driving. The wheel 1 transmits vibration to a suspension component of a vehicle suspension that is connected to the wheel hub 3 when a large displacement of vibration is applied to the wheel 1 from the outside, such as a road surface.

In particular, the vibration caused in the axial direction of the wheel 1 is transmitted to the suspension component through a center 122 of the wheel disk 12 (hereinafter, referred to as a "wheel center") coupled to the wheel hub 3.

For reference, reference numeral 4 designates a disk brake 4 fastened to the wheel hub 3.

As illustrated in FIG. 1, the wheel center 122 has an opening 122a disposed coaxially with the wheel hub 3. The opening 122a is opened and closed by a center cap 123 and defines a predetermined space between the center cap 123 and the wheel hub 3.

Since the typical wheel 1 is provided with the predetermined space between the center cap 123 and the wheel hub 3, the external appearance and design of the wheel 1 may not be changed even when a vibration absorption unit is mounted on the back surface of the center cap 123.

Thus, the present disclosure includes a vibration absorption unit mounted on the back surface of a center cap 123 that transmits the axial vibration of a wheel 1 to a suspension component of the vehicle suspension, thereby enabling the vibration absorption unit to reduce the vibration of the wheel 1.

The vibration absorption unit can increase the vibration absorption capability of the wheel 1 without changing the external appearance and design of the wheel 1.

Figure 2:
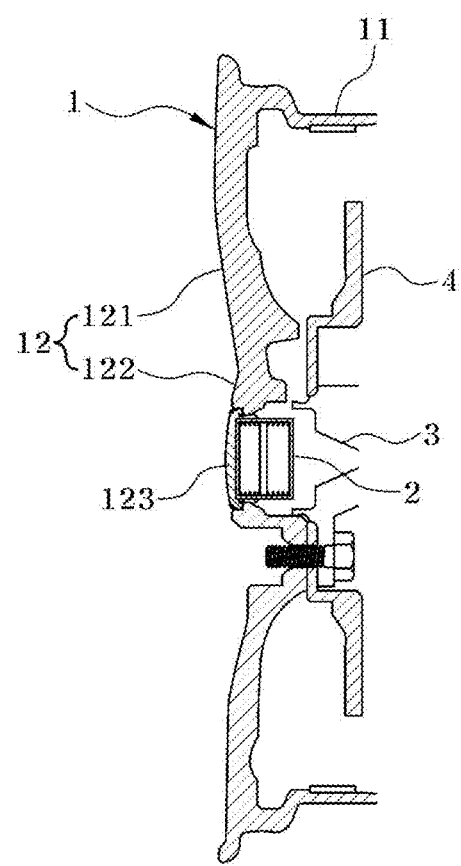
FIG. 2 is a cross-sectional view illustrating a vehicle wheel equipped with a vibration absorber according to the present disclosure.
Figure 3:
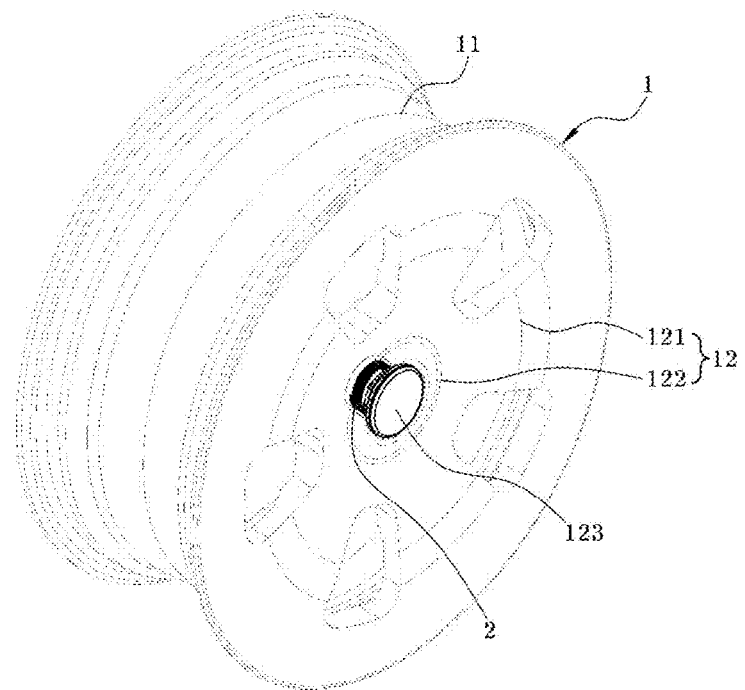
FIG. 3 is a perspective view illustrating the vehicle wheel equipped with the vibration absorber according to the present disclosure.

As illustrated in FIGS. 2 and 3, the wheel 1 may have a structure of a typical wheel. The wheel 1 includes a wheel rim 11 on which a tire is mounted and a wheel disk 12 coupled to a wheel hub 3. The wheel disk 12 may include a wheel center 122 corresponding to the center of the wheel 1 and wheel disk 12 and may include a wheel spoke 121 disposed between the wheel center 122 and the wheel rim 11.

The wheel 1 may be made of the same material as a typical wheel, such as for example, an alloy material.

The wheel center 122 has an opening 122a and is provided with a center cap 123 for opening and closing the opening 122a. The opening 122a may be disposed coaxially with the wheel hub 3.

The opening 122a is disposed at a predetermined distance from the wheel hub 3 in the axial direction of the wheel 1. A predetermined space is thus defined behind the center cap 123.

Therefore, it is possible to mount a vibration absorption unit 2 on the back surface of the center cap 123 without modification of the wheel 1. In other words, the vibration absorption unit 2 may be mounted on the back surface of the center cap 123 without changing the appearance and design of the wheel 1.

The vibration applied to the wheel 1 from the road surface during driving is transmitted to the wheel center 122 via the wheel spoke 121 and is input to the suspension of the vehicle through the wheel center 122. Particularly, the vibration caused in the axial direction of the wheel 1 is finally transmitted to the vehicle suspension via the wheel center 122.

Therefore, since the vibration absorption unit 2 is mounted on the back surface of the center cap 123, it is possible to effectively suppress the axial vibration of the wheel 1.

Among the vibrations of the wheel 1, the vibration caused in the axial direction of the wheel 1 is referred to herein as a "first vibration".

The vibration absorption unit 2 may be mounted on the back surface of the center cap 123 to absorb the first vibration of the wheel 1 transmitted through the center cap 123.

Figure 4:
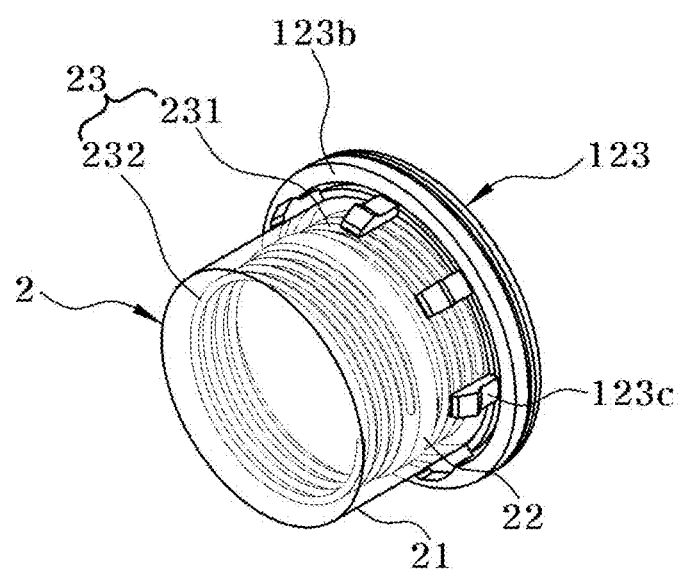
FIG. 4 is a perspective view illustrating the vibration absorber according to the present disclosure.
Figure 5:
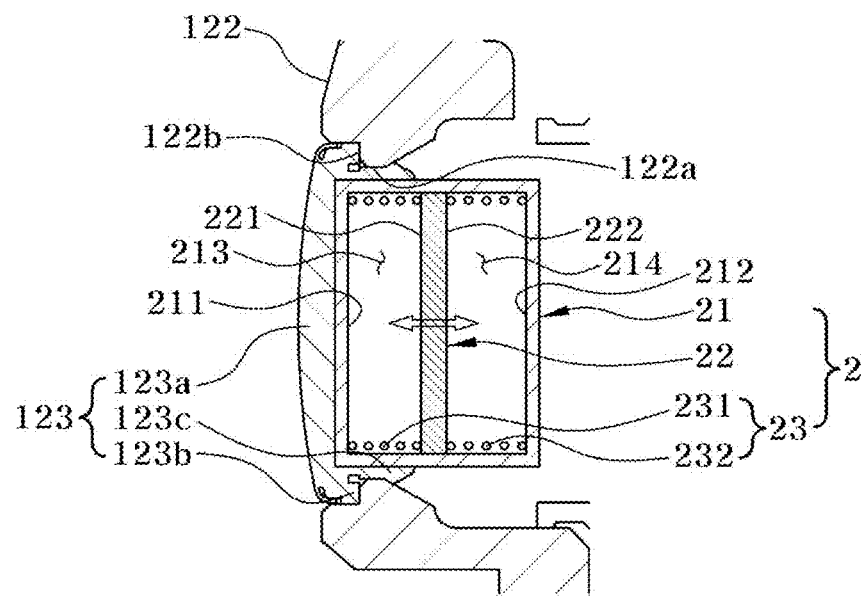
FIG. 5 is an enlarged cross-sectional view illustrating the vibration absorber according to the present disclosure.

As illustrated in FIGS. 4 and 5, the vibration absorption unit 2 may include a housing 21 attached to the back surface of the center cap 123, a mass body 22 mounted inside the housing 21, and an elastic support 23 supporting the mass body 22.

The housing 21 has an internal space in which the mass body 22 and the elastic support 23 are accommodated. For example, the housing 21 may have a cylindrical structure that has an enclosed internal space.

The mass body 22 is disposed in the internal space of the housing 21 to vibrate by the first vibration transmitted through the center cap 123. The mass body 22 may vibrate in the axial direction of the wheel 1 by the first vibration in the housing 21 to thereby cancel out the first vibration of the wheel 1.

The mass body 22 may have a plate shape that has a predetermined thickness and may have an outer diameter smaller than the inner diameter of the housing 21 so as to smoothly vibrate by the first vibration in the housing 21.

The elastic support 23 is disposed in the internal space of the housing 21 to support the mass body 22 vibrated by the first vibration. In other words, the elastic support 23 supports the mass body 22 to vibrate in the axial direction of the wheel 1.

The elastic support 23 supports the mass body 22 by the elasticity thereof. In other words, the elastic support 23 has elasticity for supporting the mass body 22 to be vibratable in the housing 21.

Specifically, the elastic support 23 may include an outer spring 231 and an inner spring 232. The outer and inner springs 231 and 232 may be disposed on both surfaces of the mass body 22, respectively.

The outer spring 231 may be disposed in the internal space of the housing 21 to support a first surface 221 of the mass body 22, and the inner spring 232 may be disposed in the internal space of the housing 21 to support a second surface 222 of the mass body 22.

The first surface 221 of the mass body 22 is a surface directed toward the center cap 123. The second surface 222 is a surface directed opposite to the center cap 123.

The internal space of the housing 21 may be divided into a first space 213 and a second space 214 by the mass body 22. The first space 213 is a space defined toward the center cap 123 on the basis of the mass body 22. The second space 214 is a space defined opposite to the center cap 123 on the basis of the mass body 22.

The outer spring 231 may be disposed in the first space 213 and the inner spring 232 may be disposed in the second space 214.

The outer spring 231 may be mounted between the first surface 221 of the mass body 22 and a first inner surface 211 of the housing 21. The inner spring 232 may be mounted between the second surface 222 of the mass body 22 and a second inner surface 212 of the housing 21.

In other words, both ends of the outer spring 231 may be fixedly mounted on the first surface 221 of the mass body 22 and the first inner surface 211 of the housing 21, respectively. Both ends of the inner spring 232 may be fixedly mounted on the second surface 222 of the mass body 22 and the second inner surface 212 of the housing 21, respectively.

The first inner surface 211 of the housing 21 is an inner surface facing the first surface 221 of the mass body 22 and the second inner surface 212 is an inner surface facing the second surface 222 of the mass body 22.

When the mass body 22 is vibrated by the first vibration of the wheel 1, the outer and inner springs 231 and 232 support the mass body 22 while being compressed or tensioned.

Specifically, the inner spring 232 is tensioned by the mass body 22 when the outer spring 231 is compressed by the mass body 22. The outer spring 231 is tensioned by the mass body 22 when the inner spring 232 is compressed by the mass body 22.

The outer and inner springs 231 and 232 may cancel out the vibration of the wheel 1 while being compressed or tensioned according to the vibration of the mass body 22.

The vibration absorption unit 2 configured as described above receives the vibration of the wheel 1 through the center cap 123.

As illustrated in FIGS. 4 and 5, the center cap 123 may include: a cap part 123a on which the housing 21 is mounted; a flange part 123b for transmitting the first vibration of the wheel 1 to the vibration absorption unit 2; and a hooking part 123c coupled to the wheel center 122.

The cap part 123a is configured to cover the opening 122a of the wheel center 122 and the housing 21 is fixedly attached to the back surface of the cap part 123a. The outer surface of the housing 21 may be pressed against the back surface of the cap part 123a.

The flange part 123b is provided at the edge of the cap part 123a to receive the first vibration through the wheel center 122. The flange part 123b may be formed integrally with the cap part 123a.

The flange part 123b may come into contact with the wheel center 122 to receive the first vibration. Specifically, the flange part 123b may be connected in a surface contact state to a stepped part 122b of the wheel center 122 to receive the first vibration. In other words, the first vibration may be transmitted to the flange part 123b through the stepped part 122b.

The stepped part 122b may have a flat surface formed in a direction perpendicular to the axial direction of the wheel 1. The flange part 123b may be pressed against and in contact with the flat surface of the stepped part 122b. The flange part 123b may have a surface corresponding to the flat surface of the stepped part 122b.

The hooking part 123c may be latched to the wheel center 122 when the flange part 123b comes into contact with the stepped part 122b. The hooking part 123c provides a coupling force for keeping the center cap 123 coupled to the wheel center 122 when the flange part 123b is stacked on the stepped part 122b and the cap part 123a closes the opening 122a.

The hooking part 123c protrudes from the back surface of the cap part 123a and is disposed in the circumferential direction of the cap part 123a. The hooking part 123c comes into contact with the outer surface of the housing 21 when the housing 21 is attached to the back surface of the cap part 123a.

The hooking part 123c enters the opening 122a of the wheel center 122 and is pressed toward the housing 21 by the wheel center 122 when the flange part 123b is seated on the stepped part 122b of the wheel center 122. In other words, the hooking part 123c may be pressed into and coupled to the opening 122a of the wheel center 122.

In the typical wheel, an empty space is present behind the center cap (see FIG. 1). Thus, it is also possible to assemble the center cap 123 to the wheel center 122 by the same assembly method as the existing center cap assembly method.

However, since the weight of the center cap 123 is increased by the vibration absorption unit 2, the center cap 123 may include the hooking part 123c to secure the coupling force to the wheel center 122.

Further, the vibration absorption unit 2 may absorb the first vibration of the wheel 1 by the principle of a dynamic vibration absorber.

Figure 6:
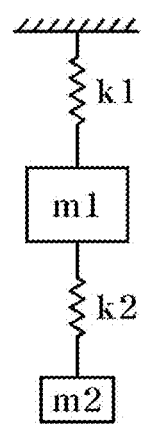
FIG. 6 is a conceptual diagram for explaining the principle of vibration absorption of the vibration absorber according to the present disclosure.

FIG. 6 is a diagram illustrating that: the mass of the wheel 1 is defined as $m_1$; the axial stiffness of the wheel 1 is defined as $k_1$; the natural frequency of the first vibration of the wheel 1 is defined as $\omega_1$; the mass of the mass body 22 is defined as $m_2$; the stiffness of the elastic support 23 is defined as $k_2$; and the natural frequency of the mass body 22 is defined as $\omega_2$. The stiffness of the elastic support 23 is a sum of the spring constant of the outer spring 231 and the spring constant of the inner spring 232.

Referring to FIG. 6, the natural frequency ω2 of the mass body 22 is determined according to the mass m2 of the mass body 22 and the stiffness k2 of the elastic support 23 as indicated in the following Equation 1. The first vibration (displacement) of the wheel 1 may be canceled out when the natural frequency ω2 coincides with the natural frequency ω1 of the wheel 1:

$$\omega 2 = \sqrt{\frac{k2}{m2}}. \quad \text{[Equation 1]}$$

Since the natural frequency ω1 of the wheel 1 is determined according to the defined mass m1 and stiffness k1 of the wheel 1, it is possible to suppress the first vibration of the wheel 1 by controlling the mass m2 of the mass body 22 and the stiffness k2 of the elastic support 23.

In other words, by controlling the natural frequency ω2 of the mass body 22, it is possible to cancel out the first vibration of the wheel 1 without changing the appearance and design of the wheel 1.

According to the results of research, the first vibration of the wheel 1 occurs in the frequency band of about 300 to 400 Hz and the road noise of the vehicle occurs in the frequency band of about 250 to 500 Hz.

Therefore, the vibration absorption unit 2 can attenuate the road noise of the vehicle by intensively eliminating the first vibration of the wheel 1 involved in the frequency band in which the road noise occurs.

As apparent from the above description, the vibration absorber for vehicle wheels according to the present disclosure can reduce the vibration of the wheel without changing the external appearance and design of the wheel and the weight of the wheel itself.

Therefore, when the vibration absorber is applied to the vehicle wheel, it is possible to optimize the appearance and design of the wheel without considering the stiffness of the wheel against vibration. It is also possible to reduce the weight of the wheel without considering the stiffness of the wheel against vibration.

The disclosure has been described in detail with reference to specific embodiments thereof. However, it should be appreciated by those having ordinary skill in the art that changes may be made in these embodiments without departing from the principles and spirit of the disclosure, the scope of which is defined in the appended claims and their equivalents.

What is claimed is:

1. A vibration absorber for vehicle wheels, the vibration absorber comprising:
   a center cap configured to open and close an opening provided at a center of a wheel; and
   a vibration absorption unit mounted on a back surface of the center cap to absorb a first vibration in an axial direction of the wheel transmitted through the center cap,
   wherein the vibration absorption unit includes
      a housing mounted on the back surface of the center cap,
      a mass body disposed in an internal space of the housing to vibrate in the axial direction of the wheel by the first vibration transmitted through the center cap, and
      an elastic support disposed in the internal space of the housing to support the mass body such that the mass body is able to vibrate in the axial direction of the wheel,
   wherein the internal space of the housing is divided into a first space and a second space by the mass body, and
   wherein the elastic support comprises an outer spring disposed in the first space, both ends thereof being mounted to the mass body and the housing, and an inner spring disposed in the second space, both ends thereof being mounted to the mass body and the housing.

2. The vibration absorber of claim 1, wherein the center cap comprises:
   a cap part having a back surface to which the housing is attached;
   a flange part provided at an edge of the cap part and connected to a wheel center of the wheel to receive the first vibration of the wheel; and
   a hooking part provided on the back surface of the cap part so that the hooking part is coupled to the wheel center when the flange part is connected to the wheel center.

3. The vibration absorber of claim 2, wherein the wheel center has a stepped part connected to the flange part in a surface contact state.

4. The vibration absorber of claim 1, wherein the mass body has a natural frequency determined according to a mass of the mass body and a stiffness of the elastic support, and wherein the natural frequency of the mass body is determined to coincide with a natural frequency of the wheel.

5. The vibration absorber of claim 1, wherein the first vibration of the wheel is a vibration occurring in a frequency band of 300 to 400 Hz.

6. The vibration absorber of claim 1, wherein the wheel comprises a wheel rim on which a tire is mounted and a wheel disk coupled to a wheel hub, and wherein the housing is mounted on the back surface of the center cap and disposed in a space between the center cap and the wheel hub.

* * * * *